United States Patent
Gummagatta et al.

(10) Patent No.: US 8,694,353 B2
(45) Date of Patent: Apr. 8, 2014

(54) EVENT SCHEDULING DEVICE AND METHOD

(75) Inventors: Srikanth Narayana Reddy Gummagatta, Bangalore (IN); Pradeep Kumar Sindhagatta Krishnappa, Bangalore (IN)

(73) Assignee: Samsung Electronics Co., Ltd (KR)

(*) Notice: Subject to any disclaimer, the term of this patent is extended or adjusted under 35 U.S.C. 154(b) by 71 days.

(21) Appl. No.: 13/398,362

(22) Filed: Feb. 16, 2012

(65) Prior Publication Data

US 2012/0209860 A1 Aug. 16, 2012

(30) Foreign Application Priority Data

Feb. 16, 2011 (IN) .............................. 446/CHE/2011

(51) Int. Cl.
*G06Q 10/00* (2012.01)
(52) U.S. Cl.
USPC ......... 705/7.18; 705/7.11; 707/722; 707/736; 707/758
(58) Field of Classification Search
None
See application file for complete search history.

(56) References Cited

U.S. PATENT DOCUMENTS

| | | | |
|---|---|---|---|
| 8,244,566 B1* | 8/2012 | Coley et al. ................. | 705/7.11 |
| 2002/0004734 A1* | 1/2002 | Nishizawa ..................... | 705/9 |
| 2003/0050997 A1* | 3/2003 | Hickey et al. ................ | 709/217 |
| 2004/0243677 A1 | 12/2004 | Curbow et al. | |
| 2005/0149858 A1 | 7/2005 | Stern et al. | |
| 2006/0253867 A1* | 11/2006 | Potrebic et al. ................ | 725/50 |
| 2007/0179829 A1* | 8/2007 | Laperi et al. .................... | 705/9 |
| 2008/0114638 A1* | 5/2008 | Colliau et al. ................... | 705/9 |
| 2010/0318398 A1* | 12/2010 | Brun et al. ....................... | 705/9 |
| 2011/0054978 A1* | 3/2011 | Mohil ............................... | 705/9 |
| 2012/0096385 A1* | 4/2012 | Bank et al. .................... | 715/772 |
| 2012/0109801 A1* | 5/2012 | Clark et al. .................... | 705/35 |
| 2012/0166635 A1* | 6/2012 | Tokuyama .................... | 709/224 |

FOREIGN PATENT DOCUMENTS

EP 1 808 802 7/2007

* cited by examiner

*Primary Examiner* — Hung Le
(74) *Attorney, Agent, or Firm* — The Farrell Law Firm, P.C.

(57) ABSTRACT

A method and device are provided for scheduling an event. Text is detected in a text application of a computing device. The detected text includes at least one keyword from one or more types of keyword. At least one event associated with a user of the computing device to be scheduled based on the detected text is determined. The at least one event is automatically scheduled based on the detected text.

26 Claims, 7 Drawing Sheets

09742811148 : My bday and wdding falls on 21/12/2009 & 22/12/2009 rspctly.

| REPLY | OPTIONS |

FIG.6A

| From | 09742811148 |
|---|---|
| Event | Birthday |
| Date | 21/12/2009 |
| Time | 5 PM |
| BufTime | 1 hour |

| YES | BACK |

FIG.6B

| From | 09742811148 |
|---|---|
| Event | Wedding |
| Date | 22/12/2009 |
| Time | 5 PM |
| BufTime | 1 hour |

| YES | BACK |

FIG.6C

EVENT SCHEDULING DEVICE AND METHOD

PRIORITY

This application claims priority under 35 U.S.C. §119(a) to an Indian Patent Application filed in the Indian Patent Office on Feb. 16, 2011 and assigned Serial No. IN 446/CHE/2011, the entire disclosure of which is incorporated herein by reference.

BACKGROUND OF THE INVENTION

1. Field of the Invention

The present invention relates generally to the field of scheduling systems, and more particularly, to an event scheduling device and an event scheduling method.

2. Description of the Related Art

Traditionally, individuals and businesses have maintained printed calendars to schedule their time and to provide reminders of when events have been scheduled. Typically, individuals or business representatives manually write on the printed calendars in order to schedule events. Besides printed calendars, electronic calendars have also become commonplace. Electronic calendars are provided by software executing on various computing devices, such as personal computers or handheld computers. These paper or electronic based calendars are generally referred to as Personal Information Managers (PIMs).

More recently, web-based calendars have been developed and made available to users over the Internet. The web-based calendars allow users with Internet access to maintain their calendar. A user can access their web-based calendar by use of a network browser coupled to the Internet, such as, for example, a HyperText Markup Language (HTML) browser. Web-based calendars provide worldwide accessibility and are easy to share amongst users. However, appointment capabilities are generally not provided in the web-based calendars.

SUMMARY OF THE INVENTION

The present invention has been made to address at least the above problems and/or disadvantages and to provide at least the advantages described below. Accordingly, an aspect of the present invention provides a method a device for automatically scheduling an event based on text detected in an application of a computing device.

According to one aspect of the present invention, a computer implemented method is provided for scheduling an event. Text is detected in a text application of a computing device. The detected text includes at least one keyword from one or more types of keyword. At least one event associated with a user of the computing device to be scheduled based on the detected text is determined. The at least one event is automatically scheduled based on the detected text.

According to another aspect of the present invention, a non-transitory computer-readable storage medium is provided having instructions for scheduling an event stored therein, that when executed by a computing device, cause the computing device to perform a method having the steps of: detecting text in a text application of a computing device, wherein the detected text includes at least one keyword from one or more types of keyword; determining at least one event associated with a user of the computing device to be scheduled based on the detected text; and automatically scheduling the at least one event based on the detected text.

According to an additional aspect of the present invention, a computing device is provided for scheduling an event. The computing device includes a processor and a memory coupled to the processor. The memory includes a event scheduling module for: detecting text in a text application of a computing device, wherein the detected text includes at least one keyword from one or more types of keyword; determining at least one event associated with a user of the computing device to be scheduled based on the detected text; and automatically scheduling the at least one event based on the detected text.

BRIEF DESCRIPTION OF THE DRAWINGS

The above and other aspects, features and advantages of the present invention will be more apparent from the following detailed description when taken in conjunction with the accompanying drawings, in which:

FIGS. 6A through 6C illustrate screenshots showing the detecting of multiple events in a text message and the setting of multiple alerts based on the detected events, according to an embodiment of the present invention.

DETAILED DESCRIPTION OF EMBODIMENTS OF THE PRESENT INVENTION

Figure 1:
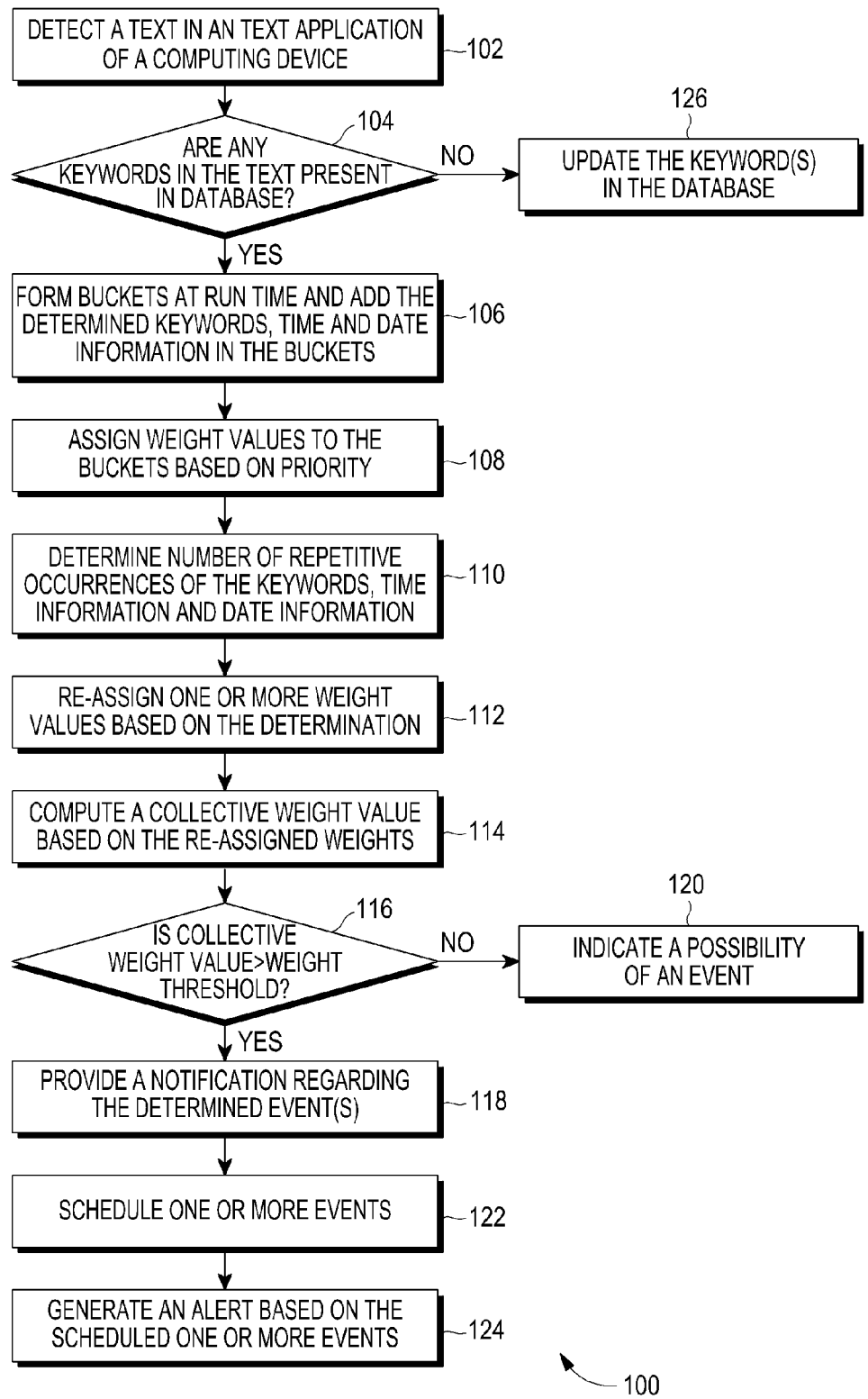
FIG. 1 is a flowchart illustrating a method of scheduling an event, according to an embodiment of the present invention.

Embodiments of the present invention are described in detail with reference to the accompanying drawings. The same or similar components may be designated by the same or similar reference numerals although they are illustrated in different drawings. Detailed descriptions of constructions or processes known in the art may be omitted to avoid obscuring the subject matter of the present invention.

Embodiments of the present invention provide an event scheduling device and method.

FIG. 1 is a flowchart 100 illustrating method of scheduling an event, according to an embodiment of the present invention. It is assumed herein that a user opens a text application (e.g., an email client, web mail, a Short Message Service (SMS) message, a Multi-media Message Service (MMS), a memo pad, etc.) on his/her device (e.g., a mobile device, a personal digital assistant, a laptop, a personal computer, etc.) including text associated with an event. The steps of the flowchart 100 describe the automatic scheduling of an event, in accordance with an embodiment of the present invention.

In step 102, text is detected in a text application of a computing device associated with the user. For example, the detected text includes types of keywords, time information, and date information. The types of keywords include, for example, an event based keyword (e.g., birthday, wedding, appointment, meeting, etc.), an associated keyword (e.g., invite, attend, etc.), a negation keyword (e.g., cancel, don't, etc.), a sure keyword (e.g., reminder, don't forget, etc.), and a pseudotime keyword (e.g., today, evening, morning, tomorrow, etc.). In embodiments of the present invention, the text in the text application is parsed to determine whether there are any types of keywords, time information, and date information in the text of the text application. In an embodiment of the present invention, the text is parsed upon receiving a request from the user. In another embodiment of the present invention, the text is parsed automatically when the text application is opened by the user.

In step 104, it is determined whether any of the determined keywords match keywords in a scheduler keyword database. In an embodiment of the present invention, it is determined whether each keyword in the determined keywords matches with any keyword in the scheduler keyword database. If no match is found, it is determined whether a first character and a last character of each keyword matches with keywords in the scheduler keyword database having the same first and last character, otherwise step 126 is performed. If the first character and the last character of keywords match, non-vowel characters or a significant substring (e.g., including or excluding non-vowel characters) in the keywords are matched with the keywords having the same first character and the last character in the scheduler keyword database, otherwise step 126 is performed. If the non-vowel characters or a significant substring in the keywords do not match, then step 126 is performed in which the scheduler keyword database is updated with the non-matched keywords. If a keyword match is found or the non-vowel characters or a significant substring in the keywords match, the flowchart 100 proceeds to step 106. Further, keywords associated with the matched keywords are identified based on the proximity to the matched keywords.

In step 106, one or more buckets are formed at run time for each keyword type associated with matching keywords, the determined time information, and the determined date information. The matching keywords, the determined time information, and the determined date information are added in the respective buckets. In step 108, a weight value is assigned to each of the one or more buckets based a priority associated with the buckets. In an embodiment of the present invention, the priority is assigned to each of the buckets based on matching keywords of keyword types, determined time information, and determined date information. In step 110, a number of repetitive occurrences of the matched keywords, the time information, and the date information in a corresponding one of the buckets is determined.

In step 112, a weight value is re-assigned to each of the buckets based on the determination of the number of repetitive occurrences. For example, an additional weight is assigned to the bucket containing words that appear several times in the scheduled appointment. In other example, a distance with respect to a keyword and elements in the buckets in the order they appear in the text of the text application is calculated. Accordingly, the weight value is assigned to the buckets containing the keywords. If the proximity of the particular element is within a predetermined proximity threshold, a weight value is added, otherwise the weight value is subtracted.

In step 114, a collective weight value is computed based on the weight of each of the buckets. In step 116, it is determined whether the collective weight value is greater than a predetermined weight threshold. If the collective weight value is greater than predetermined weight threshold, it implies that a new event is identified from the text in the text application. When it is implied that a new event is identified, an automatic notification (e.g., a pop up) associated with the identified event is provided on a display of the computing device, in step 118. The process also indicates whether the event is a new event, or already scheduled event by accessing data in an electronic calendar associated with the user. Accordingly, the automatic notification queries the user whether the event is to be scheduled in the case of a new event, or whether the event is to be cancelled or rescheduled in the case of an already scheduled event. Additionally, a list of scheduled events associated with the event is provided on the display of the computing device based on the user request. For example, the user may highlight an event in the text and/or contact information associated with the text of the text application, such that the list of scheduled events associated are retrieved and displayed on the display of the computing device.

If it is determined that the collective weight value is not greater than the predetermined weight threshold in step 116, it implies that there is a possibility that the text of the text application indicates at least one event. An indication is provided to the user through a widget on the display of the computing device regarding the possibility of an event in the text of the text application, in step 120. In accordance with the steps 118 and 120, the user is allowed to edit the content associated with the event prior to scheduling the event.

In step 122, one or more events are scheduled automatically upon receiving instructions of the user. The event information (e.g., contact information, address information, name information, etc.) associated with the scheduled event also includes information associated with persons associated with the event and the organizer of the event. At step 124, an identified alert associated with one or more of the scheduled events is generated on the computing device.

Moreover, in an embodiment of the present invention, a non-transitory computer-readable storage medium having instructions to schedule one or more events stored therein, when executed by the computing device, causes the computing device to perform a method illustrated in FIG. 1.

With reference to the foregoing description, an SMS application displays a SMS message "I am inviting you my weddng tomorrow at 5 PM in Bangalore hotel". The SMS message is parsed and a partial match search is performed for the keywords "weddng" and "tomorrow". In the partial match search, "weddng" and "tomorrow" are detected as an event keyword and a pseudotime keyword, respectively. Further, the word "inviting" is identified as an associated keyword and "5 PM" as time information. Also, the user has already set reminders with the "weddng" keyword. There are five buckets, viz. keyword bucket b1, negation bucket b2, sure word bucket b3, true time bucket b4, and pseudo time bucket b5, and priority is assigned as p1, p2, p3, p4 and p5 (p1>p2>p3>p4>p5). Let w1, w2, w3, w4, and w5 be the weight values assigned to the buckets b1, b2, b3, b4, and b5. The words detected in the SMS message are put in respective buckets in the following manner:

1) b1={weddng};
2) b2={5 PM};
3) b3={tomorrow};
4) b4={NULL}; and
5) b5={void}.

According to an embodiment of the present invention, the collective weight value is defined as (Ew)=(w1+Ow+Aw*1+Cpw1+Cpw2+Cpw3+w2+w3) and the predetermined weight threshold is defined as (Tw)={w1+w2+w3}−{Cpw1+Cpw2+

Cpw3}. Hence, the collective weight value is greater than the predetermined weight threshold. As a result, an event is determined from the SMS message and a notification is provided to the user on the display of the computing device to schedule an event. The user may request to schedule an event based on the detected information from the SMS message.

The collective weight is computed by adding weight of the buckets (b1, b2, b3, b4, and 5), weight of previously occurred words, weight of words which are in close proximity to each other in the SMS message, and weight of words in associated bucket multiplied by number of words in associated bucket. For example, since no words in the SMS message are put in bucket b4 and bucket b5, w4, w5, Cpw4 and CPw5 are not included in the equation.

If the proximity of particular element is within the limit proximity threshold (PT), then Cpw (proximity weight) is added to the effective weight. If the proximity of particular element is out of limit PT, then Cpw (proximity weight) is subtracted from the collective weight. Cpw1, Cpw2, and Cpw3 is proximity weight of words w1, w2, and w3 respectively. If the words are present in the negation bucket, then automatically Nw is subtracted from the collective weight.

The 'Aw' is the associated weight of associated words, 'Aw*n(Aw*1)' corresponds to Aw times the number of words present in the associated bucket. For example, if wedding is the event keyword, then associated words are "invite", "attend" etc. In this case, n=1. Ow is the occurrence weight that indicates weight of words previously occurred while setting reminders.

The predetermined weight threshold is a sum of weight assigned to each of the buckets minus sum of proximity weight. The weight threshold is computed to determine sensitivity level of the event detected in the SMS message. The following are the use cases:

If Ew>Tw, a notification pops up on the GUI.
If Ew<=Tw, the icon animates for a longer duration.
If the Ew has low value, the icon animates for a small duration.
If the Ew is very low, the icon remains as it is.

In an alternate embodiment of the present invention, if the SMS message says "the meeting is cancelled", the collective weight value is generated as (Ew)=W1+(−Nw), where, W1 is weight assigned to the bucket B1 and Nw is a weight assigned to a negation bucket b2. Therefore, the collective weight value (Ew) is not greater than the predetermined weight threshold (Tw).

Figure 2:
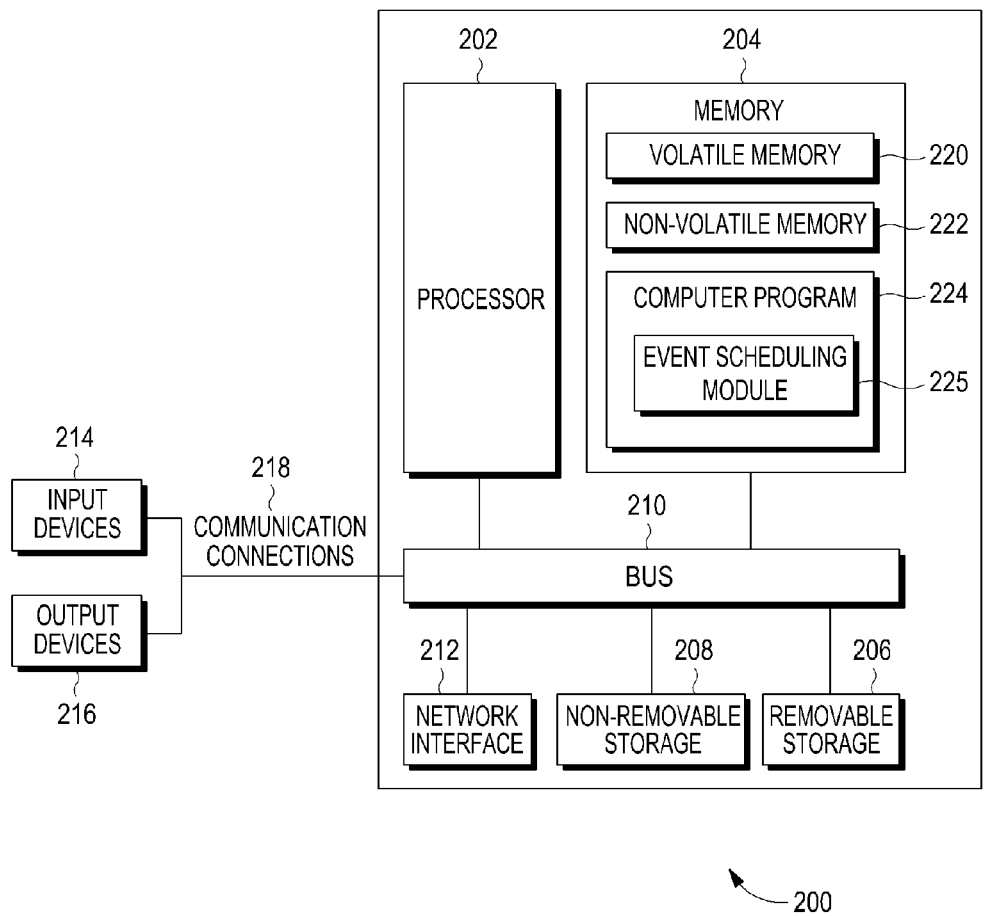
FIG. 2 is a diagram illustrating components of a computing device, according to an embodiment of the present invention.

FIG. 2 is a diagram illustrating components of a computing device 200, according to an embodiment of the present invention. FIG. 2 and the corresponding description are intended to provide a brief, general description of the suitable computing device 200 in which certain embodiments of inventive concepts contained herein may be implemented.

The general computing device 200 may be a mobile device, a smart phone, a tablet, a personal computer, a laptop, or a personal digital assistant, which includes a processor 202, a memory 204, a removable storage 206, and a non-removable storage 208. The computing device 200 additionally includes a bus 210 and a network interface 212. The computing device 200 may include or have access to one or more user input devices 214, one or more output devices 216, and one or more communication connections 218, such as, for example, a network interface card or a universal serial bus connection. The one or more user input devices 214 may be embodied as a keyboard or a mouse, for example. The one or more output devices 216 may be embodied as a display, for example. The communication connections 218 may include, for example, a Local Area Network (LAN), a Wide Area Network (WAN), or a General Packet Radio Service (GPRS).

The memory 204 includes a volatile memory 220 and a non-volatile memory 222. A variety of computer-readable storage media may be stored in and accessed from the memory elements of the computing device 200, such as the volatile memory 220 and the non-volatile memory 222, the removable storage 206 and the non-removable storage 208. Computer memory elements may include any suitable memory device for storing data and machine-readable instructions, which include, for example, a Read Only Memory (ROM), a Random Access Memory (RAM), an Erasable Programmable ROM (EPROM), an Electrically EPROM (EEPROM), a hard drive, a removable media drive for handling Compact Disks (CDs), Digital Video Disks (DVDs), diskettes, magnetic tape cartridges, memory cards, Memory Sticks™, and the like.

The processor 202, as used herein, refers to any type of computational circuit, such as, but not limited to, a microprocessor, a microcontroller, a complex instruction set computing microprocessor, a reduced instruction set computing microprocessor, a very long instruction word microprocessor, an explicitly parallel instruction computing microprocessor, a graphics processor, a digital signal processor, or any other type of processing circuit. The processor 202 may also include embedded controllers, such as generic or programmable logic devices or arrays, application specific integrated circuits, single-chip computers, smart cards, and the like.

Embodiments of the present invention may be implemented in conjunction with program modules, including functions, procedures, data structures, and application programs, for performing tasks, or defining abstract data types or low-level hardware contexts. Machine-readable instructions stored on any of the above-mentioned storage media may be executable by the processor 202 of the computing device 200. For example, a computer program 224 may include an event scheduling module 225 in the form of machine-readable instructions capable of scheduling an event based on text in a text application residing in the computing device 200, according to the embodiments of the present invention. The machine-readable instructions may cause the computing device 200 to encode according to the various embodiments of the present invention.

For example, the event scheduling module 225 detects text in a text application of a computing device. The event scheduling module 225 further determines at least one event associated with a user of the computing device to be scheduled based on the text detected in the text application. Moreover, the event scheduling module 225 automatically schedules the at least one event associated with the user based on the text detected in the text application.

Figure 3A:
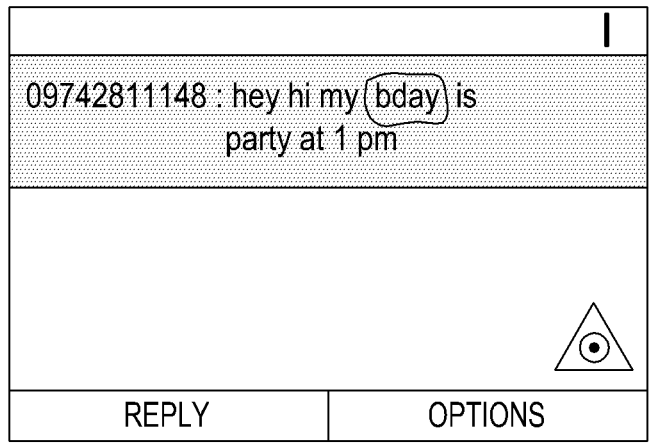
FIGS. 3A and 3B illustrate screenshots showing the automatic scheduling of an event when a user highlights text in a message, according to an embodiment of the present invention.
Figure 3B:
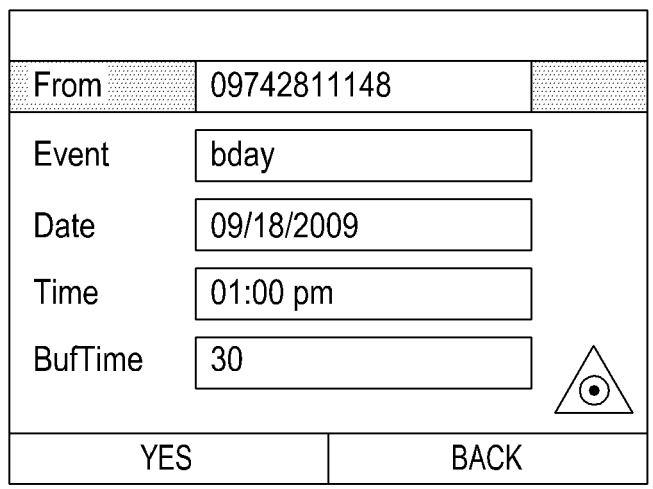

FIGS. 3A and 3B illustrate screenshots showing the automatic scheduling of an event when a user highlights a text in a message, according to an embodiment of the present invention. As shown in FIG. 3A, the user opens a text message (e.g., an SMS text message) in a text application (e.g., a text editor, a message composer, etc.) on a handheld device (e.g., a mobile phone). The user then selects/highlights an event based keyword 'bday' in the text message and selects an omnipresent icon located on the display of the handheld device.

For example, the user can tap/touch the omnipresent icon in a touch based handheld device or press a designated key/sequence of keys in a keypad based handheld device. As a result, an automatic notification indicating the event pops up on the display of the handheld device as shown in FIG. 3B. Alternatively, the event scheduling module 225 may automatically determine keywords in the text message and provide a notification on the display of the handheld device in real time as per the method of FIG. 1. The event notification includes an event subject field, a date field, a time field, a mobile number of a sender of the message field, and a snooze/buffer time field. The above fields in the notification may be filled automatically by extracting time, date and other information in the text message. The user may edit any of the above fields and schedule the event and set an alert based on the highlighted keyword 'bday'. Additionally, the highlighted keyword is added in the scheduler keyword database and hence the scheduler keyword database is replenished in real time.

Figure 4A:
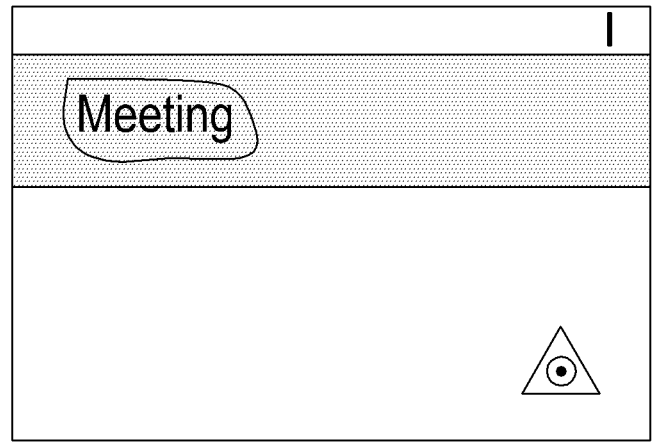
FIGS. 4A and 4B illustrate screenshots showing the automatic display of a list of scheduled events associated with a keyword on a display screen, according to an embodiment of the present invention.
Figure 4B:
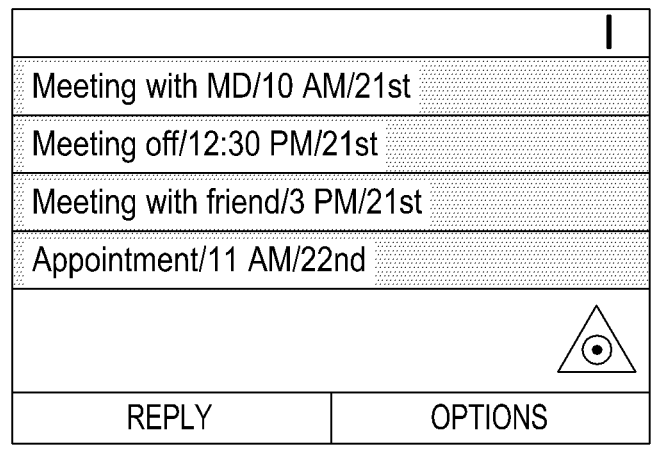

FIGS. 4A and 4B are diagrams illustrating screenshots showing the automatic display of a list of scheduled event associated with a keyword on a display screen, according to an embodiment of the present invention. As shown in FIG. 4A, the user highlights a keyword 'meeting' displayed in a text editor or message composer of the handheld device, and selects the omnipresent icon (e.g., extended touch or extended key press). Accordingly, a list of scheduled events associated with the keyword 'meeting' is displayed on the handheld device as illustrated in FIG. 4B. In one embodiment of the present invention, the calendar/organizer in the handheld device is accessed to determine a presence of a scheduled event or the scheduler keyword database is accessed to obtain a list of schedule events matching the highlighted keyword 'meeting' and associated keyword 'appointment'.

The user may also open a received message followed by selection of omnipresent icon, which provides the user with the list of scheduled events matching the date and time of the message. Also, a list of scheduled events is provided on the display of the handheld device when the user speaks a keyword associated with the list of scheduled events and selects the omnipresent icon. Alternatively, when the omnipresent icon on the display is selected, a list of scheduled event associated with current date and time is provided.

Figure 5A:
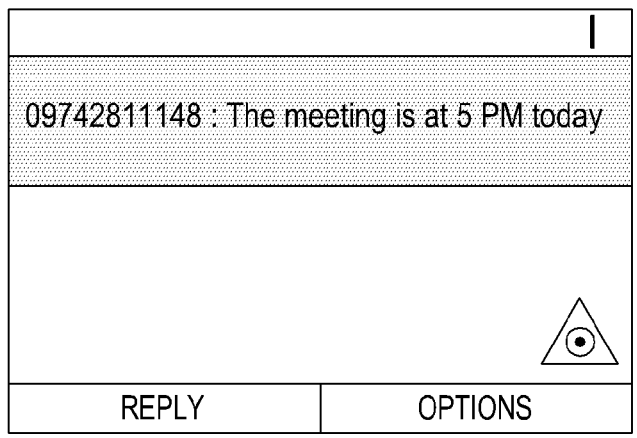
FIGS. 5A through 5C illustrate screenshots showing the rescheduling of a scheduled event based on rescheduling information in a text message, according to an embodiment of the present invention.
Figure 5B:
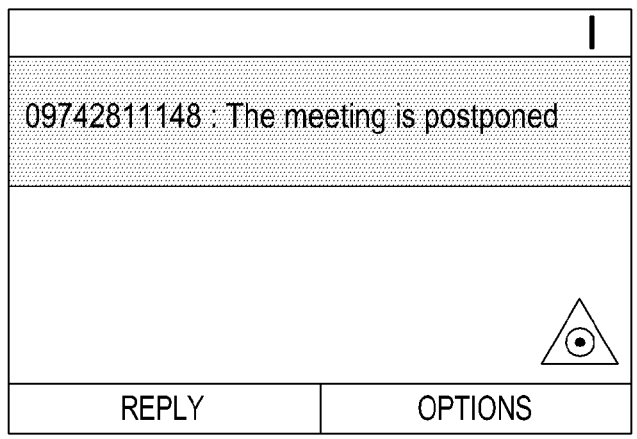
Figure 5C:
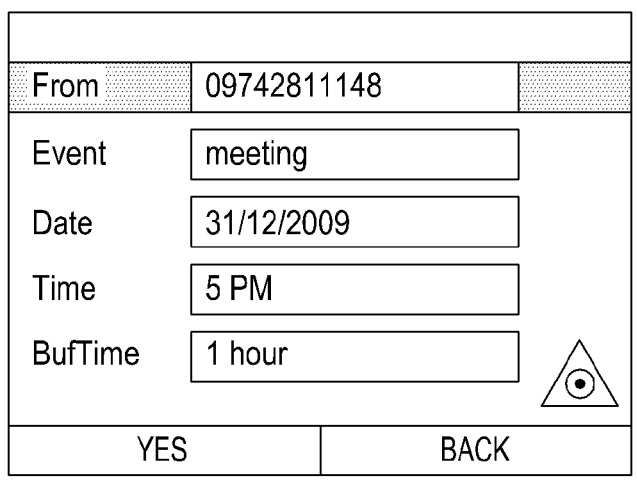

FIGS. 5A through 5C are diagrams illustrating screenshots showing the rescheduling a scheduled event based on rescheduling information in a text message, according to an embodiment of the present invention. As shown in FIG. 5A, the user receives a text message at 10 am indicating that 'a meeting is at 5 pm today'. The event scheduling module 225 automatically detects keywords 'meeting', '5 pm' and 'today', when the user opens the received message and provides a notification on the display of the handheld device. The user sets an alert for the event 'meeting' at 5 pm on the same day. The user then receives another text message at 3 pm indicating that 'the meeting is postponed' from the sender of the previous message received at 10 am, as illustrated in FIG. 5B. Accordingly, the event scheduling module 225 detects a keyword 'postpone' and provides the previously scheduled alert to the user so that the user can reschedule/delete the set alert, as illustrated in FIG. 5C. Accordingly, the event scheduling module 225 keeps track of the previously scheduled alerts, and SMSs and Emails associated with the previously scheduled alerts.

FIGS. 6A through 6C are diagrams illustrating screenshots showing the detection of multiple events in a text message and the setting of multiple alerts based on the detected events, according to an embodiment of the present invention. As shown in FIG. 6A, when the user opens a text message containing the text 'My bday and wdding falls on 21/12/2009 & 22/12/2009 rspctly', the event scheduling module 225 detects keywords 'bday', 'wdding', '21/12/2009', and '22/12/2009'. Accordingly, multiple notifications associated with events 'birthday' and 'wedding' are provided on the display of the handheld device, such that the user sets multiple alerts based on the notifications as depicted in FIGS. 6B and 6C.

Figure 7:
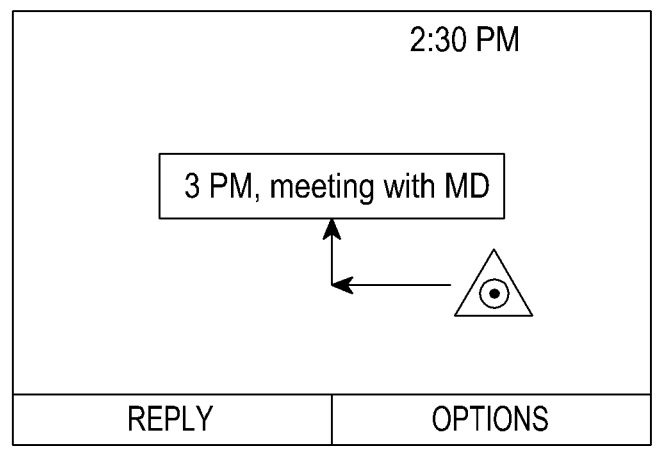
FIG. 7 illustrates a screenshot showing an alert pop up on a display screen based on time, date and snooze information associated with a scheduled event, according to an embodiment of the present invention.

FIG. 7 is a diagram illustrating a screenshot of an alert pop up on a display screen based on time, date and snooze information associated with a scheduled event, according to an embodiment of the present invention. An alert pops up on the display of the handheld device to remind the user of the scheduled event of the date, time and snooze information associated with the scheduled event. In one embodiment of the present invention, the alert may pop up upon selecting an omnipresent icon in such a manner that the immediate alert associated with scheduled event is provided on the display.

While the invention has been shown and described with reference to certain embodiments thereof, it will be understood by those skilled in the art that various changes in form and detail may be made therein without departing from the spirit and scope of the invention as defined by the appended claims.

Furthermore, the various devices, modules, analyzers, generators, and the like described herein may be enabled and operated using hardware circuitry, for example, complementary metal oxide semiconductor based logic circuitry, firmware, software and/or any combination of hardware, firmware, and/or software embodied in a machine readable medium. For example, the various electrical structure and methods may be embodied using transistors, logic gates, and electrical circuits, such as application specific integrated circuit.

What is claimed is:

1. A computer implemented method for scheduling an event, the method comprising the steps of:
    detecting text in a text application of a computing device, wherein the detected text comprises at least one keyword from one or more types of keyword;
    determining at least one event associated with a user of the computing device to be scheduled based on the detected text; and
    automatically scheduling the at least one event based on the detected text,
    wherein determining the at least one event associated with the user of the computing device comprises:
        computing a collective weight value associated with the at least one keyword; and
        identifying an event to be scheduled when the collective weight value exceeds a predetermined threshold.

2. The method of claim 1, wherein the detected text comprises at least one of time information and date information.

3. The method of claim 2, wherein the one or more types of keyword comprise at least one of an event based keyword, an associated keyword, a negation keyword, a sure keyword, and a pseudotime keyword.

4. The method of claim 3, wherein detecting the text in the text application of the computing device comprises:
    identifying the at least one keyword, the time information, and the date information by parsing the text in the text application.

5. The method of claim 4, wherein determining the at least one event associated with the user of the computing device comprises:
    determining whether the at least one keyword matches keywords in a scheduler keyword database;
    when the at least one keyword matches at least one of the keywords in the scheduler keyword database, computing the collective weight value associated with at least one keyword, the time information, and date information;

determining whether the collective weight value is greater than a predetermined weight threshold;

when the collective weight value is greater than the predetermined weight threshold, providing an automatic notification on a display of the computing device associated with the determined event; and when the collective weight value is not greater than the predetermined weight threshold, indicating a possibility of an event in the text of the text application to the user via the display of the computing device.

6. The method of claim 5, wherein determining whether the at least one keyword matches the keywords in the scheduler keyword database further comprises:

when the at least one keyword does not match the keywords in the scheduler keyword database, updating the scheduler keyword database with the at least one keyword.

7. The method of claim 6, wherein determining whether the at least one keyword matches the keywords in the scheduler keyword database further comprises:

determining whether the at least one keyword matches the keywords in the scheduler keyword database;

when the at least one keyword does not match the keywords in the scheduler keyword database, for each non-matched keyword, determining whether a first character and a last character of a keyword matches the keywords in the scheduler keyword database;

when the first character and the last character of the keyword matches the keywords in the scheduler keyword database, determining whether a set of characters in the matched keyword match the keywords in the scheduler keyword database having the matched first character and last character, wherein the set of characters in the matched keyword comprises a significant substring in the matched keyword; and when the first character and the last character of the keyword do not match the keywords in the scheduler keyword database, updating the scheduler keyword database with the at least one keyword not matched with the keywords in the scheduler keyword database.

8. The method of claim 7, wherein computing the collective weight value associated with the at least one keyword, the time information, and date information comprises:

forming one or more buckets based on a number of types of keywords, time information, and data information, wherein each of the one or more buckets includes one of the event based keywords, the associated keywords, the negation keywords, the sure keywords, the pseudotime keywords, the time information, and the date information;

assigning a weight value to each of the one or more buckets based on a priority associated with the one or more buckets, wherein the priority is assigned to each of the one or more bucket based on the types of keywords, time information, and data information; and computing the collective weight value based on the weight of each of the one or more buckets.

9. The method of claim 8, wherein assigning the weight value to each of the one or more buckets comprises:

assigning the weight value to each of the one or more buckets based on the priority associated with the one or more buckets;

determining a number of repetitive occurrences of the types of keywords, time information, and data information in a corresponding one of the one or more buckets; and re-assigning a weight value to each of the one or more buckets based on the number of repetitive occurrences.

10. The method of claim 9, wherein the associated keyword is identified based on a proximity of a keyword to the at least one keyword.

11. The method of claim 1, further comprising:
providing a list of scheduled events associated with the detected text on a display of the computing device.

12. The method of claim 1, further comprising:
generating an alert associated with the at least one scheduled event on the computing device based on information associated with the at least one scheduled event.

13. The method of claim 1, further comprising:
enabling the user of the computing device to cancel, modify, or re-schedule the at least one scheduled event.

14. A non-transitory computer-readable storage medium having instructions for scheduling an event stored therein, that when executed by a computing device, cause the computing device to perform a method comprising the steps of:

detecting text in a text application of a computing device, wherein the detected text comprises at least one keyword from one or more types of keyword;

determining at least one event associated with a user of the computing device to be scheduled based on the detected text; and automatically scheduling the at least one event based on the detected text, wherein determining the at least one event associated with the user of the computing device comprises:

computing a collective weight value associated with the at least one keyword; and identifying an event to be scheduled when the collective weight value exceeds a predetermined threshold.

15. The storage medium of claim 14, wherein the detected text comprises at least one of time information and date information.

16. The storage medium of claim 15, wherein the one or more types of keyword comprise at least one of an event based keyword, an associated keyword, a negation keyword, a sure keyword, and a pseudotime keyword.

17. The storage medium of claim 16, wherein detecting the text in the text application of the computing device comprises:

identifying the at least one keyword, the time information, and the date information by parsing the text in the text application.

18. The storage medium of claim 17, wherein the instructions to determine the at least one event associated with the user of the computing device comprises:

determining whether the at least one keyword matches keywords in a scheduler keyword database;

when the at least one keyword matches at least one of the keywords in the scheduler keyword database, computing the collective weight value associated with at least one keyword, the time information, and date information;

determining whether the collective weight value is greater than a predetermined weight threshold;

when the collective weight value is greater than the predetermined weight threshold, providing an automatic notification on a display of the computing device associated with the determined event; and when the collective weight value is not greater than the predetermined weight threshold, indicating a possibility of an event in the text of the text application to the user via the display of the computing device.

19. The storage medium of claim 18, wherein the instructions to determine whether the at least one keyword matches the keywords in the scheduler keyword database further comprises:

when the at least one keyword does not match the keywords in the scheduler keyword database, updating the scheduler keyword database with the at least one keyword.

20. The storage medium of claim 19, wherein the instructions to determine whether the at least one keyword matches the keywords in the scheduler keyword database further comprises:

determining whether the at least one keyword matches the keywords in the scheduler keyword database;

when the at least one keyword does not match the keywords in the scheduler keyword database, for each non-matched keyword, determining whether a first character and a last character of a keyword matches the keywords in the scheduler keyword database;

when the first character and the last character of the keyword matches the keywords in the scheduler keyword database, determining whether a set of characters in the matched keyword match the keywords in the scheduler keyword database having the matched first character and last character, wherein the set of characters in the matched keyword comprises a significant substring in the matched keyword; and when the first character and the last character of the keyword do not match the keywords in the scheduler keyword database, updating the scheduler keyword database with the at least one keyword not matched with the keywords in the scheduler keyword database.

21. The storage medium of claim 20, wherein the instructions to compute the collective weight value associated with the at least one keyword, the time information, and date information comprises:

forming one or more buckets based on a number of types of keywords, time information, and data information, wherein each of the one or more buckets includes one of the event based keywords, the associated keywords, the negation keywords, the sure keywords, the pseudotime keywords, the time information, and the date information;

assigning a weight value to each of the one or more buckets based on a priority associated with the one or more buckets, wherein the priority is assigned to each of the one or more bucket based on the types of keywords, time information, and data information; and computing the collective weight value based on the weight of each of the one or more buckets.

22. The storage medium of claim 21, wherein the instructions to assign the weight value to each of the one or more buckets comprises:

assigning the weight value to each of the one or more buckets based on the priority associated with the one or more buckets;

determining a number of repetitive occurrences of the types of keywords, time information, and data information in a corresponding one of the one or more buckets; and re-assigning a weight value to each of the one or more buckets based on the number of repetitive occurrences.

23. The storage medium of claim 14, wherein the method further comprises:

providing a list of scheduled events associated with the detected text on a display of the computing device.

24. The storage medium of claim 14, wherein the method further comprises:

generating an alert associated with the at least one scheduled event on the computing device based on the information associated with the at least one scheduled event.

25. The storage medium of claim 14, wherein the method further comprises:

enabling the user of the computing device to cancel, modify, or re-schedule the at least one scheduled event.

26. A computing device for scheduling an event comprising:

a processor; and memory coupled to the processor, wherein the memory comprises an event scheduling module for:

detecting text in a text application of a computing device, wherein the detected text comprises at least one keyword from one or more types of keyword;

determining at least one event associated with a user of the computing device to be scheduled based on the detected text; and automatically scheduling the at least one event based on the detected text, wherein determining the at least one event associated with the user of the computing device comprises:

computing a collective weight value associated with the at least one keyword; and identifying an event to be scheduled when the collective weight value exceeds a predetermined threshold.

* * * * *